Patented Aug. 24, 1948

2,447,750

UNITED STATES PATENT OFFICE

2,447,750

DERIVATIVE OF THE ADDUCT OF LEVO-PIMARIC ACID AND MALEIC ANHYDRIDE AND METHOD OF PREPARATION THEREOF

George C. Harris, Wilmington, Del., assignor to Hercules Powder Company, Wilmington, Del., a corporation of Delaware No Drawing. Application May 4, 1946,
Serial No. 667,496

14 Claims. (Cl. 260—103)

This invention relates to addition products and to a method for their production, and more specifically it relates to Diels-Alder addition products of a resin acid and a monoalkyl ester of fumaric acid and to a method for the production thereof.

It is known to produce synthetic resins using as the starting material the essentially pure Diels-Alder addition product of levo-pimaric acid and maleic anhydride. Thus, in U. S. Patent 2,359,980, Fleck describes the preparation of such an essentially pure Diels-Alder addition product, which he describes as being suitable for use as a starting material for the production of high-grade resins that may be used in varnishes and for other purposes. Such resins have not been completely satisfactory compositions of matter, however, because they are not stable when subjected to the action of sunlight, and also tend to break down when kettled with drying oils at the temperatures generally employed in varnish manufacture, i. e., temperatures of about 250° C.

It is therefore an object of this invention to prepare a more useful addition product from levo-pimaric acid and maleic anhydride or maleic acid. It is also an object of this invention to prepare from levo-pimaric acid and maleic anhydride or maleic acid an addition product which is stable to the action of sunlight and other sources of ultraviolet radiation, and which is also stable when heated at temperatures up to about 250° C. Other objects of this invention are described in the paragraphs which follow.

The above and other objects are realized in accordance with this invention by preparing a synthetic material having the structural formula of the Diels-Alder addition product of levo-pimaric acid and a monoester of fumaric acid and an aliphatic alcohol having less than four carbon atoms. This addition product is characterized by substantial stability when heated at 250° C., and by substantial resistance to deterioration when subjected to ultraviolet radiation. Depending upon the alcohol employed in preparing the addition product of this invention, the said addition product is further characterized by an acid number of 258–263 and a methoxyl content of 7.1–7.3% when prepared from methyl alcohol, by an acid number of 249–254 and an ethoxyl content of 10.0–10.2% when prepared from ethyl alcohol, or by an acid number of 241–246 and a propoxyl or isopropoxyl content of 12.7–12.9% when prepared from normal propyl alcohol or isopropyl alcohol, respectively.

The essential feature of the method of this invention is the heating in solution in the desired alcohol at a temperature of 200–250° C. of a material having the structural formula of the Diels-Alder addition product of levo-pimaric acid and maleic acid or maleic anhydride together with sufficient alkali to neutralize the mixture, heating being continued for a period of time sufficient to effect substantially complete isomerization of the maleic group of atoms to the corresponding fumaric group. After the heat-treating step has been completed, the resinous material of this invention may be recovered from the alcohol solution in accordance with procedures which are well understood by those skilled in the art. Thus, where the initial addition product of levo-pimaric acid and maleic anhydride is in an essentially pure form and is characterized by a melting point by the capillary method of 222–228° C., by an acid number in acetone solution of 418–426, by an acid number in absolute alcohol solution of 278–283, and by an (alpha)$_D^{24}$ in 2% solution in absolute ethyl alcohol of plus 25 to plus 29, the resin of this invention may be obtained, after the isomerization step at 200–250° C., by cooling the mixture and thereafter precipitating the resin by the addition of acid. On the other hand, where the initial addition product is in an essentially impure form, such as is obtained by the reaction of ordinary wood rosin and maleic anhydride at 160° C., the resin of this invention may be recovered after the isomerization by removing the alcohol, dissolving the residue in water and neutralizing the aqueous solution to a pH value of 6.0–6.5 with an acid, contacting the mixture with a suitable water-immiscible solvent such as benzene, separating the water phase from the solvent phase, and thereafter adding further acid to the water phase to precipitate the product of this invention.

Having thus indicated in a general way the nature and purpose of this invention, the following example is included in order to illustrate the practice thereof.

Example 1

10 g. of the essentially pure Diels-Alder addition product of levo-pimaric acid and maleic anhydride (melting point of 226° C. by the capillary method, acid number in acetone solution of 422, acid number in absolute alcohol solution of 281, and (alpha)$_D^{24}$ in 2% solution in absolute ethyl alcohol of plus 27) was dissolved in 50 ml. of hot methanol, and the solution made alkaline to phenolphthalein indicator by the addition of a 40% solution of sodium hydroxide in water. The mixture was then placed immediately in a pressure bomb and heated for four hours at 225° C. under a pressure of 5000 lbs./sq. in. gage of nitrogen. Thereafter the mixture was cooled to room temperature, was acidified with hydrochloric acid, and the methanol evaporated. The precipitate which formed was dissolved in ethyl ether, the solution was washed free of the hydrochloric acid, dried, and the ether evaporated to obtain 10.1 g. (98% yield) of the noncrystalline Diels-Alder addition product of levo-pimaric acid and the monoester of fumaric acid and methyl alcohol. It had an acid number of 260 and a methoxyl content of 7.2%. When heated at a temperature of 250° C. this material exhibited remarkable resistance to decomposition, and this material also exhibited substantially greater resistance to deterioration when subjected to ultraviolet radiation than the initial addition product of levo-pimaric acid and maleic anhydride.

The initial addition product which is neutralized and heat treated in alcohol solution may be prepared in accordance with procedures which are well understood by those skilled in the art. Thus, in U. S. Patent 2,039,243, Krzikalla teaches the reaction of ordinary wood rosin and maleic anhydride to yield an impure mixture which is suitable for use as one of the starting materials in accordance with the method of this invention. Particularly advantageous starting materials are those in substantially pure form which consist essentially of the Diels-Alder addition product of levo-pimaric acid and maleic anhydride. Such materials are described in U. S. Patent 2,359,980 and also by Fleck and Palkin in vol. 14 of the Analytical Edition of the Industrial and Engineering Chemistry (1942), page 146. In general, any material containing levo-pimaric acid, or any other resin acid which may be reacted with maleic anhydride to form a material comprising the Diels-Alder addition product of levo-pimaric acid and maleic anhydride may be employed in preparing a starting material useful in making the product of this invention. Both the pure and the impure addition products of levo-pimaric acid and maleic anhydride may be prepared from either maleic anhydride or maleic acid, since use of both of the latter materials will result in the production of identical products as final resins. In the example, methyl alcohol was used in preparing the product of this invention, but in its place there may be employed any other aliphatic alcohol having less than 4 carbon atoms, namely, ethyl alcohol, normal propyl alcohol, and isopropyl alcohol.

Generally speaking, as the alkaline material used in accordance with this invention, I may employ any inorganic compound of an alkali or alkaline earth metal which is alkaline in aqueous solution and which reacts with the levo-pimaric acid-maleic anhydride adduct to provide a reaction product soluble in water. The alkali metal compounds are preferred since they are characterized by forming water-soluble compounds with the levo-pimaric acid-maleic anhydride adduct. Thus, in place of the sodium hydroxide employed in the example, there may be used sodium oxide, sodium carbonate, potassium hydroxide, lithium hydroxide, potassium carbonate, lithium carbonate, etc. In accordance with the method of this invention, it is necessary that sufficient alkaline material be used to render the reaction mixture alkaline to phenolphthalein indicator. Hence, when a alkali metal compound is employed, sufficient alkali metal compound must be present to result in the formation of the disodium, dipotassium, dilithium, etc., salt.

As is shown in the example, it is desirable that the alkaline material be employed in anhydrous form or in relatively concentrated aqueous solution, for example, a solution of 40% or higher, to avoid the addition of a relatively large volume of water to the reaction mixture. Thus, addition of a 5% aqueous sodium hydroxide solution will cause the precipitation of the disodium salt of the addition product of levo-pimaric acid and the monoester of maleic acid, rendering the method of this invention inoperable. The concentration of the adduct in the alcohol solution is not so critical, however, and may be varied within a wide range. Hence, the concentration of the levo-pimaric acid-maleic anhydride adduct may be within the range from 10 to 50% by weight of the solution, the more dilute solutions being preferred for the sake of ease of handling.

In the example, the isomerization was effected at a temperature of 225° C., but any temperature in the range from 200-250° C. may be used. A temperature in the range of 220-230° C. is preferred. Furthermore, the period of time during which the isomerization is carried out has been found to be quite critical and should be in the range from about 3 to about 5 hours, preferably in the range of from 4 to 4½ hours. Because of the high temperatures employed, it is necessary that the isomerization step be conducted under superatmospheric pressure, usually from about 4000 to about 6000 lb./sq. in. gage. An inert atmosphere such as hydrogen, nitrogen, etc., is employed in practically achieving the desired reaction conditions.

As previously stated, the handling of the reaction mixture upon cooling will depend upon the properties of the initial addition product employed. Where this product is the adduct of levo-pimaric acid and maleic anhydride in essentially pure form the mixture need be merely neutralized with acid in order to precipitate the product of this invention. Where the initial material is associated with neutral bodies, resin acids and reaction products thereof, in addition to the levo-pimaric-maleic anhydride adduct, however, such impurities may be separated by removing the alcohol as by distillation, contacting the residue with water, adding acid to the water phase until a pH value of 6.0–6.5 has been attained, contacting the water solution with a suitable water-immiscible solvent, separating the phases, and thereafter adding further acid to the water phase to precipitate the material of this invention. When this procedure is followed, phosphoric, acetic, hydrochloric, sulfuric, or any other organic or inorganic acid, may be used as the acid precipitating agent. The solvent employed must be water-immiscible and at the same time a solvent for the neutral bodies, resin acids, etc., associated with the levo-pimaric acid-maleic anhydride adduct used as the starting materials. For example, aliphatic hydrocarbons such as hexane, petroleum ether, etc.; aromatic hydrocarbons such as benzene, toluene; and ethers such as ethyl ether, etc., may be employed.

The addition products prepared in accordance with this invention are unique and advantageous compositions of matter. Thus, they and the esters prepared from them are characterized by substantial resistance to deterioration when subjected to the action of ultraviolet light, in comparison with comparable products of the prior art. Furthermore, the reaction products of this invention are characterized by excellent stability when heated for a prolonged period of time at 250° C., and thus they are very desirable materials for use in the preparation of polyhydric alcohol esters. Such esters are useful in the preparation of coating compositions, adhesive compositions, printing inks, etc., and may be used as modifiers for waxes, shellac substances, chewing gum bases, sizes, etc.

What I claim and desire to protect by Letters Patent is:

1. A synthetic material characterized by stability to heat at temperatures up to 250° C. and by stability to ultraviolet radiation, said synthetic material being a dicarboxylic acid and having the structural formula of a product theoretically obtained by the Diels-Alder addition of levopimaric acid and a monoester of fumaric acid with an unsubstituted aliphatic monohydric alcohol having less than four carbon atoms assuming the trans configuration of the fumaric ester group remains unchanged.

2. A synthetic material characterizer by stability to heat at temperatures up to 250° C. and by stability to ultraviolet radiation, said synthetic material being a dicarboxylic acid and having the structural formula of a product theoretically obtained by the Diels-Alder addition of levopimaric acid and a monoester of fumaric acid with methyl alcohol assuming the trans configuration of the fumaric ester group remains unchanged.

3. A synthetic material characterized by stability to heat at temperatures up to 250° C. and by stability to ultraviolet radiation, said synthetic material being a dicarboxylic acid and having the structural formula of a product theoretically obtained by the Diels-Alder addition of levopimaric acid and the monoester of fumaric acid with ethyl alcohol assuming the trans configuration of the fumaric ester group remains unchanged.

4. A synthetic material characterized by stability to heat at temperatures up to 250° C. and by stability to ultraviolet radiation, said synthetic material being a dicarboxylic acid and having the structural formula of a product theoretically obtained by the Diels-Alder addition of levopimaric acid and the monoester of fumaric acid with isopropyl alcohol assuming the trans configuration of the fumaric ester group remains unchanged.

5. The method for the preparation of a synthetic material having the structural formula of a product theoretically obtained by Diels-Alder addition of levopimaric and a monoester of fumaric acid with an unsubstituted aliphatic monohydric alcohol having less than four carbon atoms assuming the trans configuration of the fumaric ester group remains unchanged, which method comprises preparing a solution of the Diels-Alder addition product of levopimaric acid and maleic anhydride in the said alcohol, adding sufficient alkaline material to neutralize the solution to the phenolphthalein end point, the said alkaline material if employed in aqueous solution being employed in sufficiently concentrated form such that precipitation is avoided during the subsequent step of heat-treatment, heating the said solution at 200–250° C. in a closed vessel for a period of time to effect substantially complete isomerization of the maleic group to the corresponding fumaric group and recovering the said synthetic material from the reaction mixture.

6. The method for the preparation of a synthetic material having the structural formula of a product theoretically obtained by Diels-Alder addition of levopimaric and a monoester of fumaric acid with an unsubstituted aliphatic monohydric alcohol having less than four carbon atoms assuming the trans configuration of the fumaric ester group remains unchanged, which method comprises preparing a solution of the Diels-Alder addition product of levopimaric acid and maleic anhydride in the said alcohol, adding sufficient alkaline material to neutralize the solution to the phenolphthalein end point, the said alkaline material if employed in aqueous solution being employed in sufficiently concentrated form such that precipitation is avoided during the subsequent step of heat-treatment, heating the said solution at 200–250° C. in a closed vessel for from 3 to 5 hours and recovering the said synthetic material from the reaction mixture.

7. The method for the preparation of a synthetic material having the structural formula of a product theoretically obtained by Diels-Alder addition of levopimaric and the monoester of fumaric acid with methyl alcohol assuming the trans configuration of the fumaric ester group remains unchanged, which method comprises preparing a solution of the Diels-Alder addition product of levopimaric acid and maleic anhydride in the said alcohol, adding sufficient alkaline material to neutralize the solution to the phenolphthalein end point, the said alkaline material if employed in aqueous solution being employed in sufficiently concentrated form such that precipitation is avoided during the subsequent step of heat-treatment, heating the said solution at 200–250° C. in a closed vessel for from 3 to 5 hours and recovering the said synthetic material from the reaction mixture.

8. The method for the preparation of a synthetic material having the structural formula of a product theoretically obtained by Diels-Alder addition of levopimaric and the monoester of fumaric acid with ethyl alcohol assuming the trans configuration of the fumaric ester group remains unchanged, which method comprises preparing a solution of the Diels-Alder addition product of levopimaric acid and maleic anhydride in the said alcohol, adding sufficient alkaline material to neutralize the solution to the phenolphthalein end point, the said alkaline material if employed in aqueous solution being employed in sufficiently concentrated form such that precipitation is avoided during the subsequent step of heat-treatment, heating the said solution at 200–250° C. in a closed vessel for from 3 to 5 hours and recovering the said synthetic material from the reaction mixture.

9. The method for the preparation of a synthetic material having the structural formula of a product theoretically obtained by Diels-Alder addition of levopimaric and the monoester of fumaric acid with isopropyl alcohol assuming the trans configuration of the fumaric ester group remains unchanged, which method comprises preparing a solution of the Diels-Alder addition product of levopimaric acid and maleic anhydride in the said alcohol, adding sufficient alkaline material to neutralize the solution to the phenolphthalein end point, the said alkaline material if employed in aqueous solution being employed in sufficiently concentrated form such that precipitation is avoided during the subsequent step of heat-treatment, heating the said solution at 200–250° C. in a closed vessel for from 3 to 5 hours and recovering the said synthetic material from the reaction mixture.

10. The method for the preparation of a synthetic material having the structural formula of a product theoretically obtained by Diels-Alder addition of levopimaric and a monoester of fumaric acid with an unsubstituted aliphatic monohydric alcohol having less than four carbon atoms assuming the trans configuration of the fumaric ester group remains unchanged, which method comprises preparing a solution of the Diels-Alder addition product of levopimaric acid and maleic anhydride in the said alcohol, adding sufficient alkali metal compound to neutralize the solution to the phenolphthalein end point, the said alkali metal compound if employed in aqueous solution being employed in sufficiently concentrated form such that precipitation is avoided during the subsequent step of heat-treatment, heating the said solution at 200–250° C. in a closed vessel for from 3 to 5 hours, cooling the reaction mixture to a temperature below its boiling point, acidifying the reaction mixture to precipitate the said synthetic material and recovering the said synthetic material.

11. The method for the preparation of a synthetic material having the structural formula of a product theoretically obtained by Diels-Alder addition of levopimaric and the monoester of fumaric acid with methyl alcohol assuming the trans configuration of the fumaric ester group remains unchanged, which method comprises preparing a solution of the Diels-Alder addition product of levopimaric acid and maleic anhydride in the said alcohol, adding sufficient alkali metal compound to neutralize the solution to the phenolphthalein end point the said alkali metal compound if employed in aqueous solution being employed in sufficiently concentrated form such that precipitation is avoided during the subsequent step of heat-treatment, heating the said solution at 200–250° C. in a closed vessel for from 3 to 5 hours, cooling the reaction mixture to a temperature below its boiling point, acidifying the reaction mixture to precipitate the said synthetic material and recovering the said synthetic material.

12. The method for the preparation of a synthetic material having the structural formula of a product theoretically obtained by Diels-Alder addition of levopimaric and the monoester of fumaric acid with ethyl alcohol assuming the trans configuration of the fumaric ester group remains unchanged, which method comprises preparing a solution of the Diels-Alder addition product of levopimaric acid and maleic anhydride in the said alcohol, adding sufficient alkali metal compound to neutralize the solution to the phenolphthalein end point, the said alkali metal compound if employed in aqueous solution being employed in sufficiently concentrated form such that precipitation is avoided during the subsequent step of heat-treatment, heating the said solution at 200–250° C. in a closed vessel for from 3 to 5 hours, cooling the reaction mixture to a temperature below its boiling point, acidifying the reaction mixture to precipitate the said synthetic material and recovering the said synthetic material.

13. The method for the preparation of a synthetic material having the structural formula of a product theoretically obtained by Diels-Alder addition of levopimaric and the monoester of fumaric acid with isopropyl alcohol assuming the trans configuration of the fumaric ester group remains unchanged, which method comprises preparing a solution of the Diels-Alder addition product of levopimaric acid and maleic anhydride in the said alcohol, adding sufficient alkali metal compound to neutralize the solution to the phenolphthalein end point, the said alkaline material if employed in aqueous solution being employed in sufficiently concentrated form such that precipitation is avoided during the subsequent step of heat-treatment, heating the said solution at 200–250° C. in a closed vessel for from 3 to 5 hours, cooling the reaction mixture to a temperature below its boiling point, acidifying the reaction mixture to precipitate the said synthetic material and recovering the said synthetic material.

14. The method for the preparation of a synthetic material having the structural formula of a product theoretically obtained by Diels-Alder addition of levopimaric and a monoester of fumaric acid with an unsubstituted aliphatic monohydric alcohol having less than four carbon atoms assuming the trans configuration of the fumaric ester group remains unchanged, which method comprises preparing a solution in the said alcohol of a material obtained by heat-treating rosin with maleic anhydride and containing the Diels-Alder addition product of levopimaric acid and maleic anhydride, adding a sufficient amount of an alkali metal compound to neutralize the solution to the phenolphthalein end point, the said alkali metal compound if employed in aqueous solution being employed in sufficiently concentrated form such that precipitation is avoided during the subsequent step of heat-treatment, heating the said solution at 200–250° C. in a closed vessel for from 4 to 4½ hours, removing the unreacted alcohol, acidifying an aqueous solution of the resulting product to a pH value of 6.0–6.5, contacting the acidified solution with a water-immiscible liquid which is a solvent for the impurities (rosin acids and neutral bodies) contained in the starting material, separating the water phase from the solvent phase, acidifying the water phase to precipitate the said synthetic material and recovering the said synthetic material.

GEORGE C. HARRIS.